(12) United States Patent
Mischler et al.

(10) Patent No.: US 9,920,715 B2
(45) Date of Patent: Mar. 20, 2018

(54) METHOD AND SYSTEM FOR EGR CONTROL FOR AMBIENT CONDITIONS

(71) Applicant: General Electric Company, Schenectady, NY (US)

(72) Inventors: James Robert Mischler, Lawrence Park, PA (US); Luke Henry, Lawrence Park, PA (US); Greg Thomas Polkus, Waukesha, WI (US)

(73) Assignee: General Electric Company, Schenectady, NY (US)

(*) Notice: Subject to any disclaimer, the term of this patent is extended or adjusted under 35 U.S.C. 154(b) by 1373 days.

(21) Appl. No.: 13/751,340

(22) Filed: Jan. 28, 2013

(65) Prior Publication Data
US 2014/0208739 A1 Jul. 31, 2014

(51) Int. Cl.
| F02D 41/02 | (2006.01) |
| F02D 41/00 | (2006.01) |
| F02B 37/12 | (2006.01) |
| F02B 37/16 | (2006.01) |
| F02B 37/18 | (2006.01) |
| F02M 25/07 | (2006.01) |
| F02M 26/43 | (2016.01) |

(Continued)

(52) U.S. Cl.
CPC ....... *F02M 25/0706* (2013.01); *F02D 41/005* (2013.01); *F02D 41/0007* (2013.01); *F02D 41/021* (2013.01); *F02M 26/05* (2016.02); *F02M 26/10* (2016.02); *F02M 26/43* (2016.02); *F02B 37/16* (2013.01); *F02B 37/18* (2013.01); *F02B 2037/122* (2013.01); *F02B 2037/125* (2013.01); *F02D 41/144* (2013.01); *F02D 2200/701* (2013.01); *F02M 26/25* (2016.02); *F02M 26/28* (2016.02); *F02M 26/44* (2016.02); *Y02T 10/144* (2013.01); *Y02T 10/47* (2013.01)

(58) Field of Classification Search
CPC .......... F02M 25/0707; F02M 25/0749; F02M 25/0706; F02M 25/0713; F02M 25/0728; F02M 25/0731; F02M 25/0751; F02M 26/05; F02M 26/10; F02M 26/25; F02M 26/28; F02M 26/43; F02M 26/44; F02D 41/021; F02D 41/0007; F02D 41/005; F02D 41/144; F02D 2200/701; Y02T 10/47; Y02T 10/144; F02B 2037/122; F02B 2037/125; F02B 37/16; F02B 37/18; F02B 47/08; F04D 41/005; F04D 17/105

USPC ............ 60/605.2, 602; 701/102; 123/568.12; 415/1

See application file for complete search history.

(56) References Cited

U.S. PATENT DOCUMENTS 6,298,718 B1 * 10/2001 Wang .................. F02D 41/0007
                                                        701/100
7,757,549 B2 7/2010 Andreae et al.
(Continued)

*Primary Examiner* — Mark Laurenzi
*Assistant Examiner* — Paul Thiede
(74) *Attorney, Agent, or Firm* — GE Global Patent Operation; John A. Kramer

(57) ABSTRACT

Various methods and systems are provided for adjusting a flow of exhaust gas in an exhaust gas recirculation system. In one embodiment, a method for an engine comprises controlling a flow of exhaust gas through an exhaust gas recirculation system of an engine system based on a choke level of a turbocharger. For example, the flow of exhaust gas in the exhaust gas recirculation system may be reduced to within a threshold of a choke level of the turbocharger, in response to an ambient condition.

18 Claims, 4 Drawing Sheets

(51) Int. Cl.
*F02M 26/05* (2016.01)
*F02M 26/10* (2016.01)
*F02D 41/14* (2006.01)
*F02M 26/25* (2016.01)
*F02M 26/28* (2016.01)
*F02M 26/44* (2016.01)

(56) References Cited

U.S. PATENT DOCUMENTS

| | | | |
|---|---|---|---|
| 8,245,701 B2 | 8/2012 | Styles et al. | |
| 2009/0249783 A1* | 10/2009 | Gokhale | F02M 26/71 60/602 |
| 2009/0293477 A1* | 12/2009 | Shu | F02B 39/16 60/602 |
| 2011/0056199 A1* | 3/2011 | Gokhale | F02B 33/44 60/602 |
| 2012/0294703 A1* | 11/2012 | Lei | F04D 17/105 415/1 |
| 2013/0024086 A1* | 1/2013 | Henry | F02D 41/021 701/102 |
| 2014/0041384 A1* | 2/2014 | Mischler | F02D 41/0007 60/605.2 |
| 2014/0047834 A1* | 2/2014 | Polkus | F02D 23/00 60/602 |
| 2014/0067228 A1* | 3/2014 | Polkus | F02B 37/013 701/102 |

* cited by examiner

METHOD AND SYSTEM FOR EGR CONTROL FOR AMBIENT CONDITIONS

FIELD

Embodiments of the subject matter disclosed herein relate to operation of an exhaust gas recirculation system of an engine system.

BACKGROUND

Under ambient conditions which increase the operating temperature of an engine, engine power may decrease, thereby decreasing engine efficiency. Some vehicles, such as rail vehicles, may undergo tunneling operation in which the vehicle travels through a confined space, such as a tunnel. During tunneling operation, temperatures of various systems of the vehicle, such as an engine system and a cooling system, may increase. In some examples, the temperatures may increase substantially, leading to decreased power and overheating of the engine of the rail vehicle.

In one approach, heat rejection to the cooling system and tunnel may be reduced by adjusting an operating parameter such as engine exhaust gas recirculation (EGR) in response to an indication of tunneling operation. As an example, an engine EGR amount may be substantially or completely reduced. In such an approach, however, operation of a turbocharger in the engine may exceed a choke level, thereby decreasing turbocharger efficiency.

BRIEF DESCRIPTION

In one embodiment, a method (e.g., method for controlling an engine) comprises controlling a flow of exhaust gas through an exhaust gas recirculation system based on a choke level of a turbocharger.

In this way, turbocharger operation may be maintained below a choke level, thereby increasing turbocharger efficiency and reducing degradation of the turbocharger from turbocharger over speed. In some embodiments, controlling the flow of exhaust gas through the exhaust gas recirculation system may be performed responsive to an ambient condition. For example, an exhaust gas recirculation flow may be reduced during an ambient condition such as an ambient temperature over a threshold temperature and/or airflow restricted operation, thereby reducing an effort of the cooling system of the engine and improving engine operating efficiency.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments for adjusting a flow of exhaust gas in an exhaust gas recirculation (EGR) system based on a choke level of a turbocharger. Under certain ambient conditions, such as an ambient temperature above a threshold temperature or during airflow restricted operation (such as tunneling), temperatures of an engine system and a cooling system of a vehicle may increase. In some examples, the temperatures may increase substantially, leading to decreased power and overheating of the engine. During these conditions, EGR flow may be reduced to decrease the cooling effort of the engine, thereby increasing engine efficiency. The amount of EGR flow reduction may be based on a choke limit or level of a turbocharger. As such, the EGR flow may be maintained such that turbocharger operation does not exceed the choke level.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles and off-highway vehicles (OHV), the latter of which include mining equipment, marine vessels, and locomotives and other rail vehicles. For clarity of illustration, a locomotive is provided as an example of a mobile platform supporting a system incorporating an embodiment of the invention.

Figure 1:
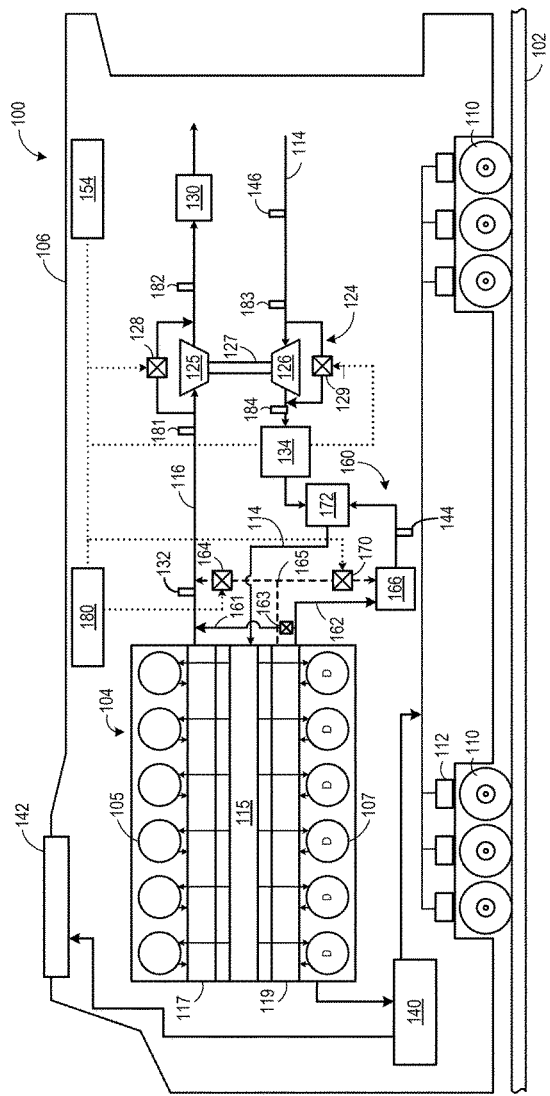
FIG. 1 shows a schematic diagram of a rail vehicle with an engine according to an embodiment of the invention.

Before further discussion of the approach for adjusting a flow of exhaust gas through an EGR system, an example of a platform is disclosed in which the engine system may be installed in a vehicle, such as a rail vehicle. For example, FIG. 1 shows a block diagram of an embodiment of a vehicle system 100, herein depicted as a rail vehicle 106 (e.g., a locomotive), configured to run on a rail 102 via a plurality of wheels 110. As depicted, the rail vehicle 106 includes an engine 104. In other non-limiting embodiments, the engine 104 may be a stationary engine, such as in a power-plant application, or an engine in a marine vessel or other off-highway vehicle propulsion system as noted above.

The engine 104 receives intake air for combustion from an intake, such as an intake manifold 115. The intake may be any suitable conduit or conduits through which gases flow to enter the engine. For example, the intake may include the intake manifold 115, the intake passage 114, and the like. The intake passage 114 receives ambient air from an air filter (not shown) that filters air from outside of a vehicle in which the engine 104 may be positioned. Exhaust gas resulting from combustion in the engine 104 is supplied to an exhaust, such as exhaust passage 116. The exhaust may be any suitable conduit through which gases flow from the engine. For example, the exhaust may include an exhaust manifold 117, the exhaust passage 116, and the like. Exhaust gas flows through the exhaust passage 116, and out of an exhaust stack of the rail vehicle 106. In one example, the engine 104 is a diesel engine that combusts air and diesel fuel through compression ignition. In other non-limiting embodiments, the engine 104 may combust fuel including gasoline, kerosene, biodiesel, or other petroleum distillates of similar density through compression ignition (and/or spark ignition).

In one embodiment, the rail vehicle 106 is a diesel-electric vehicle. As depicted in FIG. 1, the engine 104 is coupled to an electric power generation system, which includes an alternator/generator 140 and electric traction motors 112. For example, the engine 104 is a diesel engine that generates a torque output that is transmitted to the alternator/generator 140 which is mechanically coupled to the engine 104. The alternator/generator 140 produces electrical power that may be stored and applied for subsequent propagation to a variety of downstream electrical components. As an example, the alternator/generator 140 may be electrically coupled to a plurality of traction motors 112 and the alternator/generator 140 may provide electrical power to the plurality of traction motors 112. As depicted, the plurality of traction motors 112 are each connected to one of a plurality of wheels 110 to provide tractive power to propel the rail vehicle 106. One example configuration includes one traction motor per wheel. As depicted herein, six pairs of traction motors correspond to each of six pairs of wheels of the rail vehicle. In another example, alternator/generator 140 may be coupled to one or more resistive grids 142. The resistive grids 142 may be configured to dissipate excess engine torque via heat produced by the grids from electricity generated by alternator/generator 140.

In the embodiment depicted in FIG. 1, the engine 104 is a V-12 engine having twelve cylinders. In other examples, the engine may be a V-6, V-8, V-10, V-16, I-4, I-6, I-8, opposed 4, or another engine type. As depicted, the engine 104 includes a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

As depicted in FIG. 1, the non-donor cylinders 105 are coupled to the exhaust passage 116 to route exhaust gas from the engine to atmosphere (after it passes through an exhaust gas treatment system 130 and a turbocharger 124). The donor cylinders 107, which provide engine exhaust gas recirculation (EGR), are coupled exclusively to an EGR passage 162 of an EGR system 160 which routes exhaust gas from the donor cylinders 107 to the intake passage 114 of the engine 104, and not to atmosphere. By introducing cooled exhaust gas to the engine 104, the amount of available oxygen for combustion is decreased, thereby reducing combustion flame temperatures and reducing the formation of nitrogen oxides (e.g., $NO_x$).

Exhaust gas flowing from the donor cylinders 107 to the intake passage 114 passes through a heat exchanger such as an EGR cooler 166 to reduce a temperature of (e.g., cool) the exhaust gas before the exhaust gas returns to the intake passage. The EGR cooler 166 may be an air-to-liquid heat exchanger, for example. In such an example, a charge air cooler 134 disposed in the intake passage 114 (e.g., upstream of where the recirculated exhaust gas enters) may be adjusted to further increase cooling of the charge air such that a mixture temperature of charge air and exhaust gas is maintained at a desired temperature. In other examples, the EGR system 160 may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage 116 rather than the intake passage 114.

Additionally, in some embodiments, the EGR system 160 may include an EGR bypass passage 161 that is configured to divert exhaust from the donor cylinders back to the exhaust passage. The EGR bypass passage 161 may be controlled via a valve 163. The valve 163 may be configured with a plurality of restriction points such that a variable amount of exhaust is routed to the exhaust, in order to provide a variable amount of EGR to the intake.

In an alternate embodiment shown in FIG. 1, the donor cylinders 107 may be coupled to an alternate EGR passage 165 (illustrated by the dashed lines) that is configured to selectively route exhaust to the intake or to the exhaust passage. For example, when a second EGR valve 170 is open, exhaust may be routed from the donor cylinders to the EGR cooler 166 and/or additional elements prior to being routed to the intake passage 114. Further, the alternate EGR system includes a first EGR valve 164 disposed between the exhaust passage 116 and the alternate EGR passage 165.

The first EGR valve 164 and second EGR valve 170 may be on/off valves controlled by the control unit 180 (for turning the flow of EGR on or off), or they may control a variable amount of EGR, for example. As such, the valves may be adjusted into a plurality of positions between fully open and fully closed. In some examples, the first EGR valve 164 may be actuated such that an EGR amount is reduced (exhaust gas flows from the EGR passage 165 to the exhaust passage 116). For example, the opening of the first EGR valve 164 may be increased, thereby increasing the flow of exhaust from the donor cylinders to the exhaust passage 116. In other examples, the first EGR valve 164 may be actuated such that the EGR amount is increased (e.g., exhaust gas flows from the exhaust passage 116 to the EGR passage 165). For example, the opening of the first EGR valve 164 may be decreased, thereby reducing flow to the exhaust passage 116. In yet another example, the second EGR valve 170 may be actuated to reduce the amount of EGR. For example, closing the second EGR valve 170 may reduce the flow of exhaust from the donor cylinders to the intake passage 114. In some embodiments, the alternate EGR system may include a plurality of EGR valves or other flow control elements to control the amount of EGR.

In such a configuration, the first EGR valve 164 is operable to route exhaust from the donor cylinders to the exhaust passage 116 of the engine 104 and the second EGR valve 170 is operable to route exhaust from the donor cylinders to the intake passage 114 of the engine 104. As such, the first EGR valve 164 may be referred to as an EGR bypass valve, while the second EGR valve 170 may be referred to as an EGR metering valve. In the embodiment shown in FIG. 1, the first EGR valve 164 and the second EGR valve 170 may be engine oil, or hydraulically, actuated valves, for example, with a shuttle valve (not shown) to modulate the engine oil. In some examples, the valves may be actuated such that one of the first and second EGR valves 164 and 170 is normally open and the other is normally closed. In other examples, the first and second EGR valves 164 and 170 may be pneumatic valves, electric valves, or another suitable valve.

As shown in FIG. 1, the vehicle system 100 further includes an EGR mixer 172 which mixes the recirculated exhaust gas with charge air such that the exhaust gas may be evenly distributed within the charge air and exhaust gas mixture. In the embodiment depicted in FIG. 1, the EGR system 160 is a high-pressure EGR system which routes exhaust gas from a location upstream of turbocharger 124 in the exhaust passage 116 to a location downstream of turbocharger 124 in the intake passage 114. In other embodiments, the vehicle system 100 may additionally or alternatively include a low-pressure EGR system which routes exhaust gas from downstream of the turbocharger 124 in the exhaust passage 116 to a location upstream of the turbocharger 124 in the intake passage 114.

As depicted in FIG. 1, the vehicle system 100 further includes a turbocharger 124 positioned between the intake passage 114 and the exhaust passage 116. The turbocharger 124 increases air charge of ambient air drawn into the intake passage 114 in order to provide greater charge density during combustion to increase power output and/or engine-operating efficiency. The turbocharger 124 includes a turbine 125 which drives a compressor 126. The turbine 125 and compressor 126 are mechanically coupled via a shaft 127. In some embodiments, the vehicle system 100 may include a two-stage turbocharger, with the two turbochargers arranged in series. A first turbocharger may operate at a relatively lower pressure (e.g., low-pressure turbocharger) while a second turbocharger may operate at a relatively higher pressure (e.g. high-pressure turbocharger). In some examples, a two-stage turbocharger may include a high-pressure turbocharger and a low-pressure turbocharger arranged in series, three turbocharger arranged in series, two low pressure turbochargers feeding a high pressure turbocharger, one low pressure turbocharger feeding two high pressure turbochargers, or the like. In one example, three turbochargers are used in series. In another example, only two turbochargers are used in series.

As explained above, the terms "high pressure" and "low pressure" are relative, meaning that "high" pressure is a pressure higher than a "low" pressure. Conversely, a "low" pressure is a pressure lower than a "high" pressure.

In the embodiment shown in FIG. 1, the turbocharger 124 is provided with a turbine bypass valve 128 which allows exhaust gas to bypass the turbocharger 124. The turbine bypass valve 128 may be opened, for example, to divert the exhaust gas flow away from the turbine 125. In this manner, the rotating speed of the compressor 126, and thus the boost provided by the turbocharger 124 to the engine 104 may be regulated during steady state conditions. Additionally, in this embodiment, the turbocharger 124 is provided with a compressor bypass valve 129, which allows gas to bypass the second compressor 126 to avoid compressor surge, for example. In some embodiments, turbocharger 124 may not have a compressor bypass valve 129.

Figure 4:
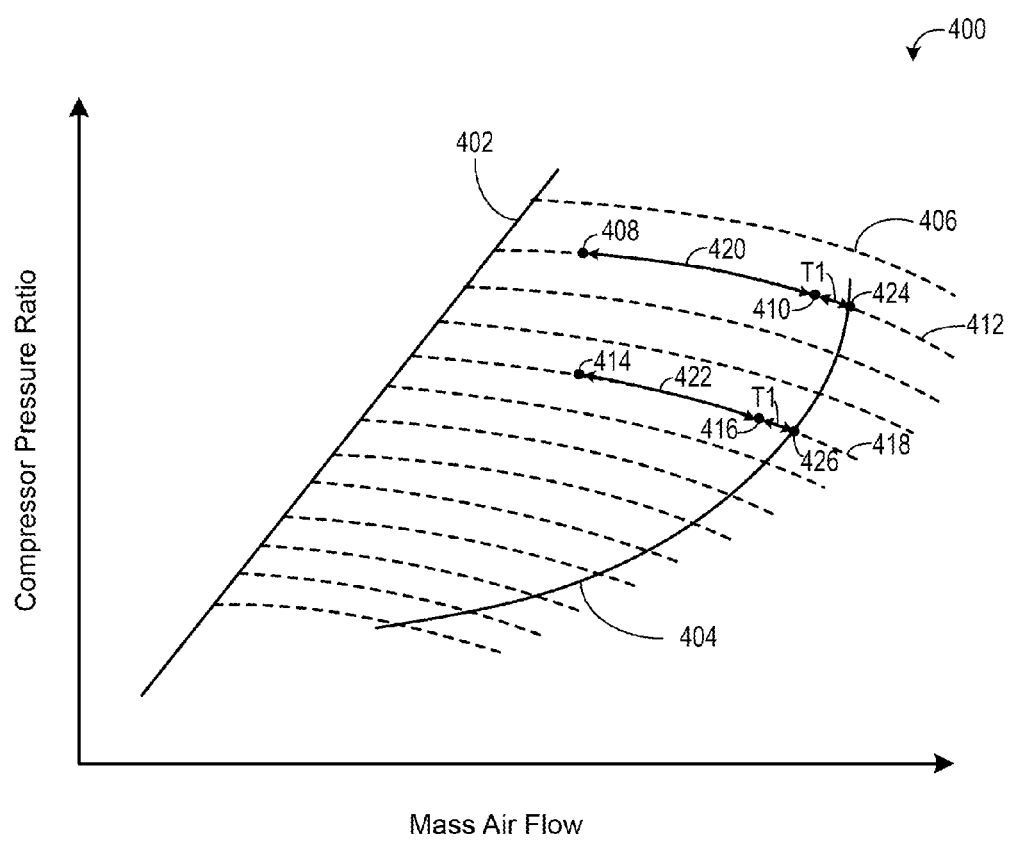
FIG. 4 shows a compressor map for a turbocharger according to an embodiment of the invention.

Operation of turbocharger 124 may be maintained within surge and choke limits of the turbocharger, thereby increasing turbocharger efficiency. Performance of the compressor 126 of the turbocharger 124 may be defined by a map defining the relationship between a compressor pressure ratio (e.g., ratio of the absolute pressure at the compressor outlet to the absolute pressure at the compressor inlet) and a mass air flow rate (e.g., mass air flow). An example of a compressor performance map 400 is shown in FIG. 4. The compressor pressure ratio is shown on the y-axis and the mass air flow rate is shown on the x-axis. The dashed lines on the map are turbine speed lines 406 which represent different speeds of the turbine 125. The compressor performance is limited by a surge line 402 and a choke line 404. At each turbine speed, there is a surge limit or level and a choke limit or level which corresponds to a compressor pressure ratio and mass air flow. Compressor performance may be maintained between the surge line 402 and choke line 404 to increase turbocharger efficiency and reduce turbocharger degradation. The surge level may be defined as the limitation of the mass air flow at the inlet of the compressor 126. If the compressor pressure ratio is too high and the mass air flow is too small, the air flow may stop going through the compressor and reverse direction until the pressure is stabilized and the positive mass air flow is reached again. This flow instability may create a pulsation and result in a disturbance termed as "surging". A choke level may be a maximum mass air flow rate through the compressor at each operating condition. The choke level may be based on the cross section of the compressor inlet.

The compressor performance map 400 may be generated by turbocharger testing. As such, a compressor performance map, such as the map shown in FIG. 4, for the turbocharger 124 may be stored within a control unit 180 of the vehicle system 100. According to embodiments disclosed herein, the control unit 180 may adjust EGR within a margin of a choke level of the compressor 126. As EGR decreases, mass air flow increases, moving turbocharger operation to the right on the compressor map. For example, the flow of exhaust gas through the EGR system may be reduced in response to an ambient condition. The amount of reducing may be based on the choke level at the current compressor operating condition. As such, the EGR rate may be reduced to a level such that mass air flow increases to a rate within a threshold of the choke level (shown as T1 on compressor performance map 400). The threshold may be an amount of mass air flow that reduces the likelihood of compressor choke. Details on controlling the EGR rate based on the choke level and compressor performance map are presented further below with regard to FIGS. 2-4. Further details for the compressor performance shown at FIG. 4 are presented below.

Returning to FIG. 1, the vehicle system 100 further includes an exhaust treatment system 130 coupled in the exhaust passage in order to reduce regulated emissions. As depicted in FIG. 1, the exhaust gas treatment system 130 is disposed downstream of the turbine 125. The exhaust gas treatment system 130 may include one or more components. For example, the exhaust gas treatment system 130 may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof.

The vehicle system 100 further includes the control unit 180, which is provided and configured to control various components related to the vehicle system 100. Herein, the control unit 180 may be referred to as the controller. In one example, the control unit 180 includes a computer control system. The control unit 180 further includes non-transitory, computer readable storage media (not shown) including code for enabling on-board monitoring and control of engine operation. The control unit 180, while overseeing control and management of the vehicle system 100, may be configured to receive signals from a variety of engine sensors, as further elaborated herein, in order to determine operating parameters and operating conditions, and correspondingly adjust various engine actuators to control operation of the vehicle system 100. For example, the control unit 180 may receive signals from various engine sensors including sensor 181 arranged in the inlet of the turbine 125, sensor 182 arranged in the exit of the turbine 125, sensor 183 arranged in the inlet of the compressor 126, and sensor 184 arranged in the outlet of the compressor 126. The sensors arranged in the inlets and outlets of the turbine and compressor may detect air temperature and/or pressure. Additional sensors may include, but are not limited to, engine speed, engine load, boost pressure, ambient pressure, exhaust temperature, exhaust pressure, exhaust flow, turbine speed, mass air flow, EGR flow, or the like. Correspondingly, the control unit 180 may control the vehicle system 100 by sending commands to various components such as traction motors, alternator, cylinder valves, throttle, heat exchangers, wastegates or other valves or flow control elements, or the like.

As another example, the controller may receive signals from one or more intake gas constituent (e.g., O2, $NO_x$, $CO_2$, and the like) sensors 146 disposed in the intake passage 114 indicating intake gas constituent concentrations. The sensors 146 may be positioned at various positions in the intake passage 114, including upstream of the turbocharger 120 and/or downstream of the turbocharger's compressor, as well as upstream of the introduction of EGR and/or downstream of the introduction of EGR into the intake system. Additionally, the sensors 146 may be coupled to the intake of all cylinders of the engine, or a subset of engine cylinders, or a single cylinder of the engine. In one example, an intake oxygen fraction or percentage may be obtained from sensors 146. The intake oxygen fraction may then be used by the controller to adjust the valves in the EGR system to deliver a specific EGR flow rate or amount of EGR.

The controller may further receive signals from one or more exhaust gas constituent (e.g., O2, $NO_x$, $CO_2$, and the like) sensors 132, 144 disposed in the exhaust passage and EGR passage, respectively indicating exhaust gas constituent concentrations. The exhaust sensors 132, 144 may be positioned at various locations in the exhaust passage 116, including upstream and/or downstream of the turbocharger's turbine, and/or upstream and/or downstream of the EGR take-off. Additionally, the sensors 132, 144 may be coupled to the exhaust of all cylinders of the engine, or a subset of engine cylinders, or a single cylinder of the engine.

In one example, tunneling or other airflow restricted operation may be determined based on these sensors. Airflow restricted operation may be engine operation when the vehicle system 100 is traveling through an airflow restricted space, such as a physical tunnel. However, there may be other airflow restricted spaces, such as within a mine or building. For example, ambient air (e.g., ambient air surrounding the vehicle when the vehicle is not operating in a tunnel) includes approximately 0% $NO_x$ and 21% $O_2$. During tunneling operation when a substantial amount of exhaust gas may be present in the ambient environment inside the tunnel, the intake gasses inducted by the engine may include additional exhaust gas (e.g., tunnel ambient exhaust gas recirculation/EGR) and thus increased $NO_x$ and reduced $O_2$ levels. This variation in the ambient gasses inducted by the engine may cause a concentration of $NO_x$ in the intake passage to increase and a concentration of $NO_x$ in the exhaust passage to decrease, and/or a concentration of $O_2$ in both the intake passage and in the exhaust passage to decrease. In response to receiving a signal that an intake or exhaust gas concentration is too low or too high (e.g., above or below expected thresholds), tunneling operation may be indicated, and the control unit 180 may adjust an operating parameter. For example, the control unit 180 may adjust one or more EGR valves to reduce the EGR amount in response to an indication of tunneling operation.

In another example, the control unit 180 may estimate geographic coordinates of rail vehicle 106 using signals from a positioning sensor, such as a Global Positioning System (GPS) receiver 154. Geographic coordinates of the vehicle 106 may be estimated or calculated. For example, a GPS signal from the GPS receiver 154 may be used to calculate the geographic coordinates of the vehicle. Geographic features in the path of the vehicle, such as the rail vehicle 106, may be signaled by an operator or calculated. For example, geographic coordinates of a set of predefined geographic features may be stored in a table. A distance between the vehicle and the set of predefined geographic features may be calculated so that the nearest geographic feature and its distance may be determined. Non-limiting examples of geographic features that may be stored in the set of predefined geographic features include a tunnel entrance, a steep grade, and a city boundary. Further, the GPS may include stored information about the predefined geographic features, such as length of a tunnel and grade of the tunnel.

In one embodiment, the controller may identify tunnel conditions based on engine intake and/or exhaust gas constituent changes and/or control the rail vehicle to adjust one or more operating parameters when tunneling operation is indicated by one or more engine intake gas and/or exhaust gas constituent sensors. For example, the controller may indicate tunneling operation when the intake gas and/or exhaust gas constituent concentration passes a threshold concentration. The controller may include further instructions for, responsive to the indication of tunneling operation, adjusting one or more engine operating parameters, such as EGR amount or rate. In another embodiment, the controller may identify tunneling operation or predict the presence of a tunnel with a GPS receiver.

The system of FIG. 1 may provide for an engine system, onboard a vehicle, including a turbocharger which includes a compressor, an exhaust gas recirculation system with an exhaust gas recirculation valve controlling a flow of exhaust gas through the exhaust gas recirculation system, and a control unit. In one example, the control unit is configured to adjust the exhaust gas recirculation valve to reduce the flow of exhaust gas through the exhaust gas recirculation system in response to an ambient condition, the reducing based on a choke level of the compressor. The ambient condition may include one or more of an ambient temperature over a threshold temperature and/or airflow restricted operation of the vehicle traveling through an airflow restricted space, such as a tunnel.

When a vehicle enters a tunnel or other airflow restricted space, the vehicle system may begin to re-ingest exhaust gases due to reduced ventilation in the tunnel. As a result, the intake air entering the engine is warmer and engine temperature increases. As the temperature of the engine increases, the engine may approach a thermal limit or threshold in which engine power is reduced. The thermal threshold may be defined by an over-temperature of an engine component, such as an oil temperature, a coolant temperature, and/or an exhaust temperature over a respective threshold temperature. As discussed above, in response to tunneling operation, the controller may reduce the flow of exhaust through the EGR system (e.g., EGR flow). Reducing EGR flow may reduce extra heat from the exhaust gases being put into the intake passage 114. As a result, the cooling effort of the engine system 100, such as the charge air cooler cooling effort, may be reduced. Additionally, reducing EGR flow may reduce the heat load applied to the vehicle cooling system by the EGR cooler 166. For these reasons, reducing EGR flow may increase engine efficiency and maintain engine power.

In addition to reducing EGR flow in response to tunneling operation, EGR flow may be reduced in response to a different ambient condition. The different ambient condition may include an ambient temperature above a threshold temperature. As such, reducing EGR flow may increase engine efficiency when the ambient temperature is relatively high and above the threshold temperature.

The reducing of EGR flow in response to one or more of the above ambient conditions may be based on the choke level of the turbocharger. Specifically, in response to the ambient condition, EGR flow may be reduced to a first level, the first level based on the choke level at a current compressor pressure ratio and turbocharger speed (e.g., turbine speed). The first level may be the EGR flow level which increases the mass air flow to within a threshold of the choke level.

An example of reducing EGR flow within a threshold of the choke level is illustrated at FIG. 4 on the compressor performance map 400. In one example, the turbocharger may initially be operating at location 408 at a first turbine, or turbocharger, speed 412 when the vehicle enters a tunnel. In response to tunneling operation, the controller reduces EGR flow to a first level which moves the compressor operation to location 410 on the map. Location 410 is within a threshold T1 of the choke level 424 at the first turbine speed 412. The first level may be based on the pressure ratio across the compressor (e.g., compressor pressure ratio) and the speed of the turbocharger.

As tunneling operation continues, engine temperature may continue to increase. Eventually, once a thermal limit or threshold is reached, engine power may be reduced. This may change where the compressor is operating on the compressor performance map 400. The compressor pressure ratio may decrease, thereby moving compressor operation to location 414 on the map at a second turbine speed 418. Location 414 is now at an increased margin from an adjusted choke level 426 at the second turbine speed 418. In response to the reduction in engine power and resulting increase in margin from the choke level, the controller reduces EGR flow to a second level. The second level increases mass air flow and moves the compressor operation to location 416 on the map. Location 416 is within a threshold T1 of the adjusted choke level 426 at the second turbine speed 418. The EGR flow is reduced by a first amount for the first decrease (location 408 to location 410) and reduced by a second amount for the second decrease (location 414 to location 426). In this example, the first amount may be greater than the second amount. This is due to a first margin 420 from the choke level 424 being greater than a second margin 422 from the adjusted choke level 418. As such, the amount the flow of exhaust gas is reduced increases as the margin from the choke level increases.

The example shown at FIG. 4 is for two operating points of a turbocharger. In other embodiments, reducing EGR flow to within a threshold T1 of a choke level may be performed for various other operating conditions of the turbocharger. For example, the turbocharger may be operating at a higher or lower turbine speed, mass air flow, and compressor pressure ratio. As such, EGR flow may be reduced by varying amounts depending on the margin from the choke level at that operating condition. Further details on a method for reducing EGR flow based on a choke level is presented below with regard to FIG. 3.

In this way, a flow of exhaust gas in an EGR system of an engine may be reduced to within a threshold of a choke level of a turbocharger, in response to an ambient condition. In one example, the ambient condition may be an ambient temperature and the reducing the flow of exhaust gas may be in response to the ambient temperature above a threshold temperature. In another example, the ambient condition may be operation in an airflow restricted area and the reducing the flow of exhaust gas may be in response to a vehicle entering the airflow restricted area. In one example, the airflow restricted area may include a tunnel and therefore the ambient condition may be a tunneling operation. In another example, the airflow restricted area may be another enclosed area in which airflow to the vehicle is restricted relative to the vehicle not being in the enclosed area. The flow of exhaust gas may be reduced to a first level, the first level based on the choke level at a current compressor pressure ratio and turbocharger speed. As tunneling operation continues, engine power may be reduced in response to over-temperature of an engine component. The flow of exhaust gas may be further reduced to a second level in response to the reduction in engine power and resulting increase in a margin from the choke level. The reduction in engine power may be the result of over-temperature of an engine component such as an oil temperature.

Figure 2:
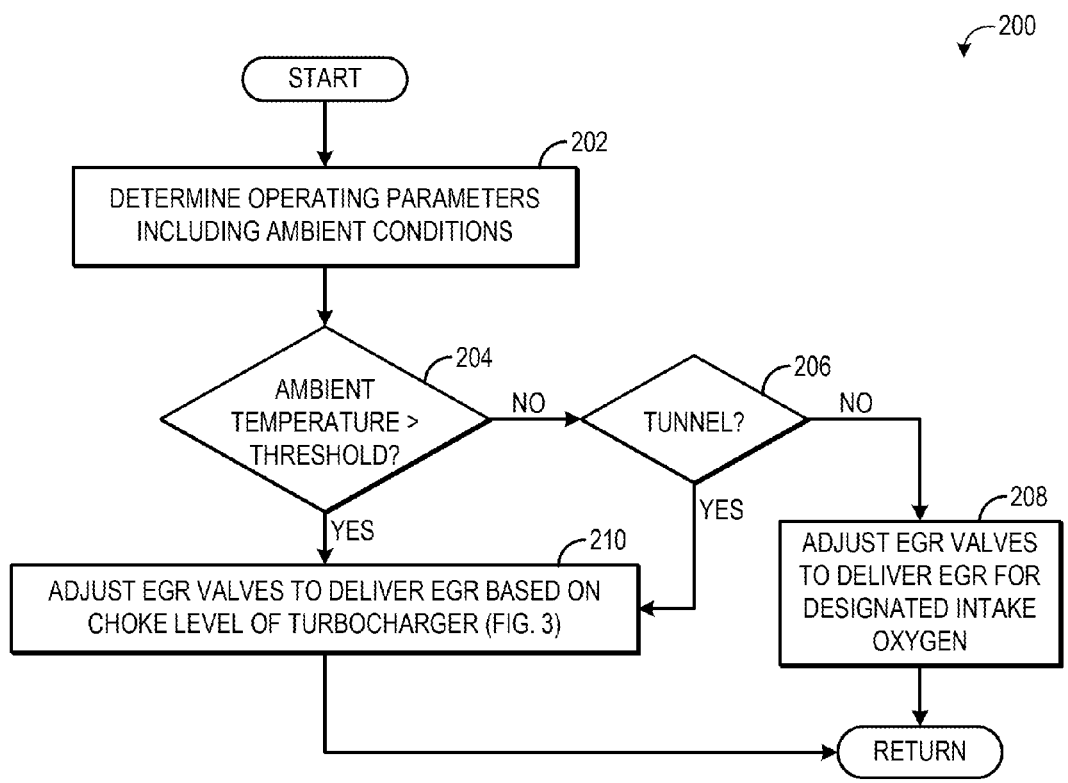
FIG. 2 shows a flow chart illustrating a method for controlling a flow of exhaust gas through an exhaust gas recirculation system according to an embodiment of the invention.

FIG. 2 shows a method 200 for controlling the flow of exhaust gas through the EGR system (referred to herein as EGR flow). The method may be performed by the controller according to instructions stored thereon. The method begins at 202 by determining engine operating parameters. Engine operating parameters may include engine speed and load, oil temperature, exhaust temperature, coolant temperature, tunneling operation, ambient temperature, EGR flow rate or amount, intake oxygen percentage, air mass flow, compressor pressure ratio, turbine speed, and the like. At 204, the controller determines if ambient temperature is greater than a threshold temperature. The threshold temperature may be based on a temperature which may increase engine temperatures to a thermal threshold, thereby resulting in overheating of the engine. The thermal threshold may be the threshold temperatures at which the engine begins to lose power. Engine temperatures may include an oil temperature, an engine coolant temperature, and/or an exhaust temperature.

If the ambient temperature is greater than the threshold temperature at 204, the method continues on to 210 to adjust the one or more EGR valves to deliver EGR flow based on a choke level of the turbocharger. This may include adjusting the EGR valves to decrease EGR flow such that air mass flow increases to within a threshold or margin of the choke level. In one example, second EGR valve 170 may be closed, or the opening of the valve may be decreased, in order to reduce EGR flow. Further details on the method at 210 are presented below with regard to FIG. 3.

Returning to 204, if the ambient temperature is not greater than the threshold temperature at 204, the method continues on to 206 to determine if the vehicle is operating in a tunnel or other airflow restricted space. In one example, determining tunnel operation may include using a GPS receiver to determine is the vehicle is in or approaching a tunnel. In another example, determining tunnel operation may include obtaining engine intake and/or exhaust gas constituent concentrations to determine tunnel operation. If the vehicle is not near or operating in a tunnel, the method continues on to 208 to adjust the EGR valves to deliver EGR for a designated intake oxygen percentage. This may include increasing or decreasing the opening of one or more of the EGR valves to increase or decrease EGR flow. However, if the vehicle is operating in a tunnel, the method continues on to 210 to adjust the one or more EGR valves to deliver EGR flow based on a choke level of the turbocharger. In this way, EGR flow may be controlled in response to an ambient condition, including ambient temperature above a threshold temperature and tunneling operation.

Figure 3:
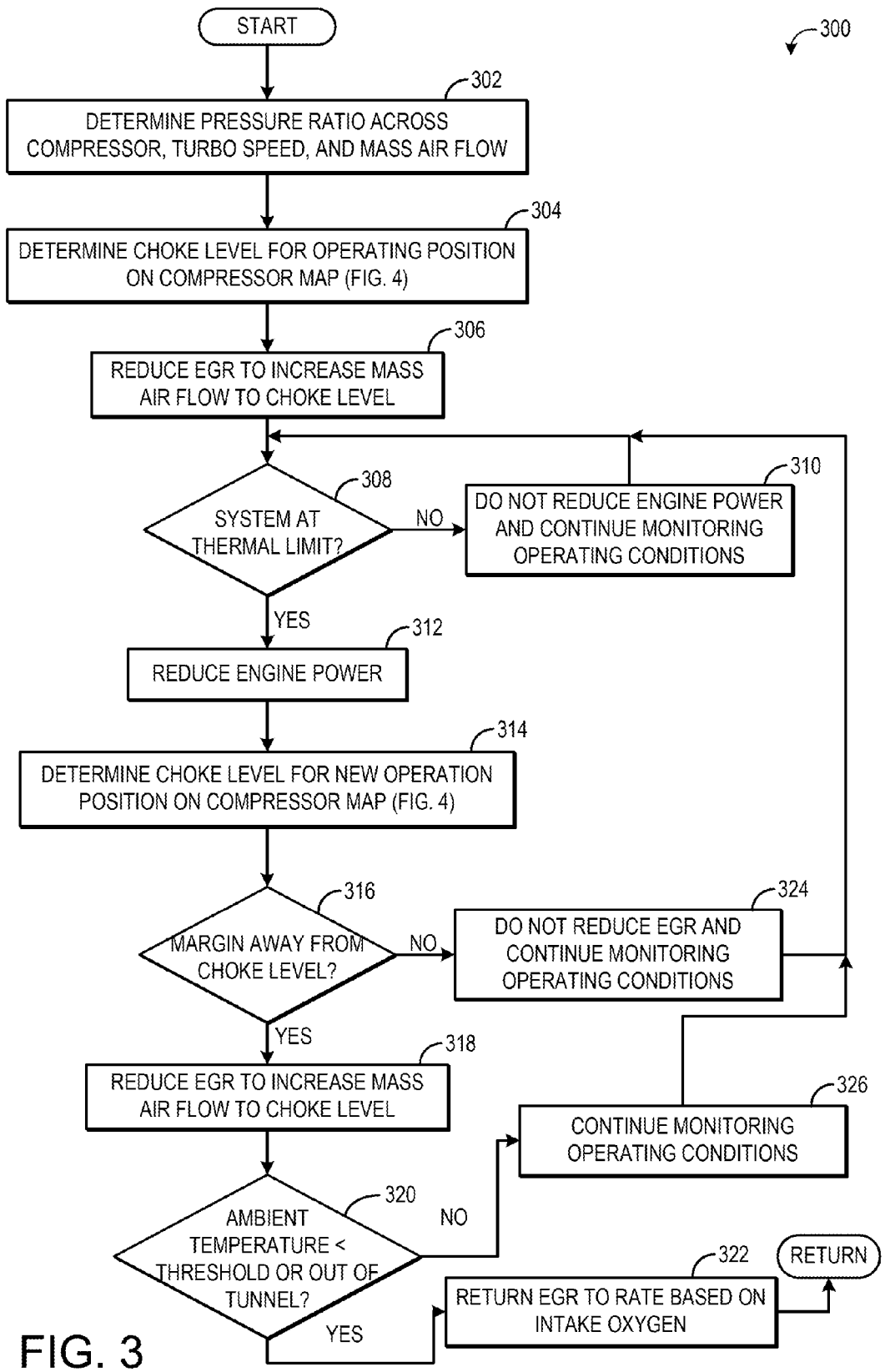
FIG. 3 shows a flow chart illustrating a method for adjusting an exhaust gas recirculation flow based on a choke level of a turbocharger according to an embodiment of the invention.

FIG. 3 illustrates a method 300 for adjusting the EGR flow based on a choke level of the turbocharger. The method may be performed by the controller according to instructions stored thereon. The method begins at 302 by determining the pressure ratio across the compressor (e.g., compressor pressure ratio), the turbocharger speed (e.g., turbine speed), and the mass air flow. At 304, the controller determines the choke level for the operating position on a compressor map, such as the compressor performance map presented at FIG. 4. For example, based on the current mass air flow, compressor pressure ratio, and/or turbine speed, the controller may determine the operating position on the compressor map. This may include determining the margin of mass air flow from the choke level. For example, the controller may determine the amount the mass air flow may be increased, and the corresponding reduction to EGR flow, to move compressor operation within a threshold of the choke level. Then, at 306, the controller reduces EGR flow to increase mass air flow to within a threshold of the choke level. As discussed above, the threshold may be an amount of mass air flow that reduces the likelihood of compressor choke. This threshold may be increased or decreased depending on an acceptable risk of compressor surging. For example, if a decrease in engine efficiency from a reduction in power is greater than a decrease in turbocharger efficiency due to surging, the threshold may be smaller.

At 308, the method includes determining if the engine system is at a thermal limit or threshold. This may include determining if the oil temperature, the exhaust temperature, or the coolant temperature is greater than a respective threshold temperature. For example, if the oil temperature is greater than a threshold temperature, the engine system may be at a thermal threshold. If the engine system is not at or above this threshold, the controller does not reduce engine power and continues monitoring engine operating conditions at 310. However, if the engine system is at or above the thermal threshold at 308, engine power is reduced at 312. A level of power reduction may be determined based on which component is experiencing an over-temperature condition. For example, a greater power reduction may be performed during a first component's over-temperature condition, and a lesser power reduction may be performed during a second, different, component's over-temperature condition, where the second component has a more severe degradation condition. Further, the amount of power reduction may be based on engine operating conditions, vehicle operating conditions, and combinations thereof. Further, as described herein, there may multiple, successive, power reduction events responsive to various components reaching over-temperature conditions successively. For example, during operation, a first component may reach its over-temperature limit resulting in a first power reduction so the engine operates with a first, reduced, power level. Then later, while the first power reduction is still in effect, a second component may reach its over-temperature limit resulting in a second, further, power reduction resulting in the engine operating with a second, reduced, power level lower than the first, reduced, power level. As the method 300 is carried out repeatedly in real-time processing, the subsequent choke level control may therefore be carried out for each power level reduction event.

As a result of decreased engine power, turbine speed and air mass flow decreases, thereby decreasing the compressor pressure ratio and changing the operating position on the compressor performance map. This, in turn, changes the choke level from the original choke level to an adjusted choke level. The method at 314 includes determining the adjusted choke level for the new turbocharger operating condition. This may include measuring the mass air flow, compressor pressure ratio, and turbine speed and then determining the adjusted choke level based on the operating position on the compressor map stored in the controller, such as the compressor map shown at FIG. 4.

At 316, the method includes determining if the turbocharger operating condition is a margin away from the adjusted choke level. In one example, the margin from the choke level may be a mass air flow amount greater than the threshold from the choke level (T1 in FIG. 4), described above. In another example, the margin from the choke level may be a larger amount of mass air flow. The margin from the choke level for reducing EGR flow may be based on a minimum mass air flow increase that results from a decrease in EGR. Specifically, if EGR flow may be reduced by a margin without pushing turbocharger operation past a threshold within the choke limit, then EGR flow may be reduced. If turbocharger operation is not a margin away from the choke level, the controller does not reduce EGR flow and continues monitoring engine operating conditions at 324. However, if turbocharger operation is a margin away from the choke level, the controller reduces EGR flow to increase mass air flow to within a threshold of the adjusted choke level at 318.

At 320, the controller determines if the ambient temperature is less than the threshold temperature or if the vehicle has exited the tunnel. If either of these conditions is met, the EGR flow is returned to a level based on an intake oxygen percentage. However, if neither of these conditions is met, the method continues monitoring engine operating conditions at 326 and returns to the method at 308 to re-check if the engine system is approaching a thermal threshold.

In this way, a flow of exhaust gas through an EGR system may be adjusted based on a choke level of a turbocharger. EGR flow may be reduced in response to an ambient condition which may include one or more of an ambient temperature above a threshold temperature and tunneling operation. As the ambient condition continues, engine power may be reduced as the engine system reaches a thermal threshold. As a result, turbocharger operation may change and a margin from the choke level may increase. In response, EGR flow may be further reduced to within a threshold of the new, adjusted choke level. In this way, EGR flow may be reduced to improve engine performance during an ambient condition while maintaining turbocharger efficiency.

Additionally, as noted above, the process may continue with successive power reductions and corresponding re-adjustments of EGR with respect to adjusted choke margins. For example, EGR flow may be reduced by a first amount in response to an ambient condition which may include one or more of an ambient temperature above a threshold temperature and tunneling operation. As the ambient condition continues, engine power may be reduced by a first amount to a first level as the engine system reaches a first thermal threshold in order to reduce over-temperature of a first component. As a result, turbocharger operation may change and a margin from the choke level may increase by a first amount. In response, EGR flow may be further reduced by a second amount to within a threshold of the new, first adjusted choke level. As the ambient condition continues and engine power continues at the first level, engine power may be further reduced by a second amount to a second level (less than the first level) as the engine system reaches a second thermal threshold in order to reduce over-temperature of a second component different from the first. As a result, turbocharger operation may again change and a margin from the choke level may increase by a second amount. In response, EGR flow may be again reduced by a third amount to within a threshold of the new, second adjusted choke level. As such, EGR may be reduced to a first level, and then to a second, lower, level to maintain the margin from surge and assist in reducing over-temperature conditions.

An embodiment relates to a method (e.g., method for controlling an engine) comprising controlling a flow of exhaust gas through an exhaust gas recirculation system of an engine system based on a choke level of a turbocharger. For example, the step of controlling the flow of the exhaust gas may comprise reducing the flow of the exhaust gas to within a threshold of the choke level of the turbocharger, in response to an ambient condition.

In another embodiment of the method, an amount the flow of exhaust gas is reduced increases as a margin from the choke level increases.

In another embodiment of the method, the ambient condition is an ambient temperature. The flow of exhaust gas is reduced in response to the ambient temperature being above a threshold temperature.

In another embodiment of the method, the ambient condition is a vehicle in which the engine is installed entering an airflow restricted area.

In another embodiment of the method, the method further comprises returning the flow of exhaust gas to a level based on a designated intake oxygen percentage when the vehicle exits the airflow restricted area.

In another embodiment of the method, the method further comprises reducing the flow of exhaust gas to a first level. The first level is based on the choke level at a current compressor pressure ratio and turbocharger speed. The method may further comprise, in other embodiments, further comprising reducing engine power in response to over-temperature of an engine component. The method may further comprise, in still further embodiments, further reducing the flow of exhaust gas to a second level in response to the reduction in engine power and resulting increase in a margin from the choke level.

Another embodiment relates to a system. The system comprises a turbocharger including a compressor, an exhaust gas recirculation system, an exhaust gas recirculation valve for controlling a flow of exhaust gas through the exhaust gas recirculation system, and a control unit. The control unit is configured to adjust the exhaust gas recirculation valve to reduce the flow of exhaust gas through the exhaust gas recirculation system in response to an ambient condition and based on a choke level of the compressor. For example, the ambient condition may include one or more of an ambient temperature over a threshold temperature or a vehicle in which the system is positioned entering an airflow restricted area (e.g., tunneling operation of the vehicle).

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method to prevent a choke condition of a compressor in an engine system of a vehicle during operation of the engine system, the engine system containing an exhaust gas recirculation (EGR) system, a turbocharger, a controller, and a first sensor, the EGR system further including an EGR valve and the turbocharger further including the compressor, the controller being operatively connected to the first sensor and the EGR valve, the method comprising:
   flowing a first amount of exhaust gas through the EGR system during the operation of the engine system;
   operating the compressor having a mass flow rate of intake air flowing through the compressor during the operation of the engine system at a first mass flow rate of the intake air, the first mass flow rate being less than a predetermined maximum flow rate associated with the choke condition of the compressor;
   measuring a temperature of ambient air surrounding the vehicle by the first sensor, and determining the mass flow rate of the intake air that is moving through the compressor;
   determining, by the controller, if the measured temperature of ambient air by the first sensor is greater than a threshold; and
   if the determined temperature of ambient air surrounding the vehicle is greater than the threshold, actuating the EGR valve by the controller during the operation of the engine system in a manner that reduces an amount of flow flowing through the EGR system to a second amount of exhaust gas that is a lower amount than the first amount of exhaust gas so that the determined mass flow rate of the compressor is increased from the first mass flow rate to a second mass flow rate that is greater than the first mass flow rate and less than the predetermined maximum flow rate as determined by the controller such that the choke condition of the compressor of the engine system does not occur.

2. The method of claim 1, wherein the threshold ambient temperature is based on an ambient temperature which results in an increase in engine temperature of the engine system to a level at which the engine system overheats and the engine system begins to lose power.

3. The method of claim 1, wherein the ambient air surrounding the vehicle includes air surrounding the vehicle during an operation of the vehicle traveling through an airflow restricted space including one of a tunnel, a mine, or a building, where ambient air inducted by the engine system while operating the vehicle through the airflow restricted space has a lower oxygen level and higher NOx level than ambient air inducted by the engine system while operating the vehicle outside of the airflow restricted space.

4. The method of claim 3, further comprising determining, via the controller, that the vehicle is traveling through the airflow restricted space based on one or more of a global positioning system (GPS) signal from a GPS receiver of the vehicle, an intake gas constituent concentration of the engine system, or an exhaust gas constituent concentration of the engine system.

5. The method of claim 1, wherein actuating the EGR valve to reduce flow of exhaust gas through the EGR system includes reducing the flow of exhaust gas through the EGR system and to an intake passage of the engine system by the amount to a first level and wherein the first level is further based on a pressure ratio across the compressor of the turbocharger and a speed of the turbocharger.

6. The method of claim 5, further comprising:
in response to over-temperature of a component of the engine system, reducing engine power; and
in response to the reduction in the engine power and a resulting increase in margin from a choke level, further reducing the flow of the exhaust gas through the EGR system to a second level, lower than the first level, where the second level is determined based on the increased margin from the choke level, where the increased margin is an increase in a mass air flow amount from the choke level.

7. The method of claim 6, wherein the choke level after the reduction in engine power is an adjusted choke level adjusted from an original choke level before the reduction in engine power and wherein reducing the flow of exhaust gas to the second level results in an increase in mass air flow through the turbocharger to a level that is within a threshold mass air flow of the adjusted choke level.

8. The method of claim 1, wherein the actuating the EGR valve includes actuating a first EGR valve positioned in an EGR passage which routes exhaust gas from a donor cylinder exhaust manifold of the engine system to an intake passage, downstream of the compressor of the turbocharger.

9. A method, comprising:
via a controller of an engine:
reducing, via actuating an exhaust gas recirculation valve in an exhaust gas recirculation system of the engine, a flow of exhaust gas in the exhaust gas recirculation system and to an intake passage of the engine to a first level of exhaust gas flow that results in a mass air flow through a turbocharger that is within a threshold mass air flow of a first choke level of the turbocharger, in response to an ambient temperature of ambient air surrounding a vehicle in which the engine is installed being greater than a threshold ambient temperature and in response to the vehicle entering an airflow restricted area; and
in response to the ambient temperature not being greater than the threshold ambient temperature and in response to the vehicle not entering or operating within the airflow restricted area, adjusting, via actuating the exhaust gas recirculation valve, the flow of exhaust gas based on a designated intake oxygen percentage.

10. The method of claim 9, wherein the first level is further reduced, via the controller, as a margin from the first choke level increases.

11. The method of claim 9, further comprising determining that the vehicle has entered the airflow restricted area based on one or more of a global positioning system (GPS) signal from a GPS receiver of the vehicle, an intake gas constituent concentration of the engine, or an exhaust gas constituent concentration of the engine, and wherein the airflow restricted area is one of a tunnel, building, or mine.

12. The method of claim 9, wherein the airflow restricted area is a physical tunnel.

13. The method of claim 9, further comprising, after reducing the flow of exhaust gas to the first level, returning the flow of exhaust gas to a second level based on the designated intake oxygen percentage in response to the vehicle exiting the airflow restricted area and in response to the ambient temperature decreasing below the threshold ambient temperature.

14. The method of claim 9, wherein the first choke level is a choke level at a current pressure ratio and turbocharger speed and further comprising reducing engine power in response to over-temperature of an engine component of the engine.

15. The method of claim 14, further comprising further reducing the flow of exhaust gas to a second level, lower than the first level, in response to the reduction in engine power from a first power level to a reduced, second power level and resulting increase in a margin from a new, adjusted choke level at a new pressure ratio and turbocharger speed at the second power level.

16. The method of claim 15, wherein the second level is based on the new, adjusted choke level.

17. A method, comprising:
via a controller of an engine system, the engine system arranged onboard a vehicle:
actuating an exhaust gas recirculation valve in an exhaust gas recirculation system of the engine system to reduce a flow of exhaust gas through the exhaust gas recirculation system by an amount, in response to an ambient condition of ambient air surrounding the vehicle, where the amount is determined based on a choke level of a turbocharger of the engine system, wherein actuating the exhaust gas recirculation valve to reduce the flow of exhaust gas through the exhaust gas recirculation system includes reducing the flow of exhaust gas through the exhaust gas recirculation system and to an intake passage of the engine system by the amount to a first level and wherein the first level is further based on a pressure ratio across a compressor of the turbocharger and a speed of the turbocharger; and
in response to over-temperature of a component of the engine system and a resulting reduction in engine power, further reducing the flow of the exhaust gas through the exhaust gas recirculation system to a second level, lower than the first level, where the second level is based on an increased margin from the choke level after the reduction in engine power, where the increased margin is an increase in a mass air flow amount from the choke level, and wherein the over-temperature of the component of the engine system includes one or more of a temperature of engine oil, a temperature of engine coolant, or a temperature of the exhaust gas over a respective threshold temperature.

18. A system for an engine, comprising:

a turbocharger including a compressor;

an exhaust gas recirculation system routing exhaust from an exhaust manifold to an intake passage;

an exhaust gas recirculation valve for controlling a flow of exhaust gas through the exhaust gas recirculation system; and a control unit including instructions stored thereon for:

adjusting the exhaust gas recirculation valve to reduce the flow of exhaust gas through the exhaust gas recirculation system by a first amount to a first level of exhaust gas recirculation flow in response to detection of an ambient condition of ambient air surrounding a vehicle in which the system is positioned, where the first amount is determined based on a determined choke level of the compressor at a current compressor pressure ratio and turbocharger speed, and where the first amount is further reduced as a margin between a current mass air flow through the compressor and a maximum mass air flow that defines the determined choke level increases, wherein the ambient condition includes one or more of an ambient temperature of the ambient air over a threshold temperature or the vehicle entering an airflow restricted area where an oxygen level of the ambient air disposed within the airflow restricted area is reduced as compared to ambient air outside of the airflow restricted area;

decreasing engine power in response to an oil temperature, exhaust temperature, or coolant temperature of the engine being greater than a respective oil, exhaust, or coolant threshold temperature;

determining a new, adjusted choke level for a new turbocharger operating condition resulting from the decrease in engine power; and further decreasing the flow of exhaust gas through the exhaust gas recirculation system to a second level, lower than the first level, in response to mass air flow through the compressor being greater than a threshold from the adjusted choke level, where the second level results in a level of mass air flow through the compressor that is within the threshold of the adjusted choke level.

* * * * *